United States Patent Office 3,328,072
Patented June 27, 1967

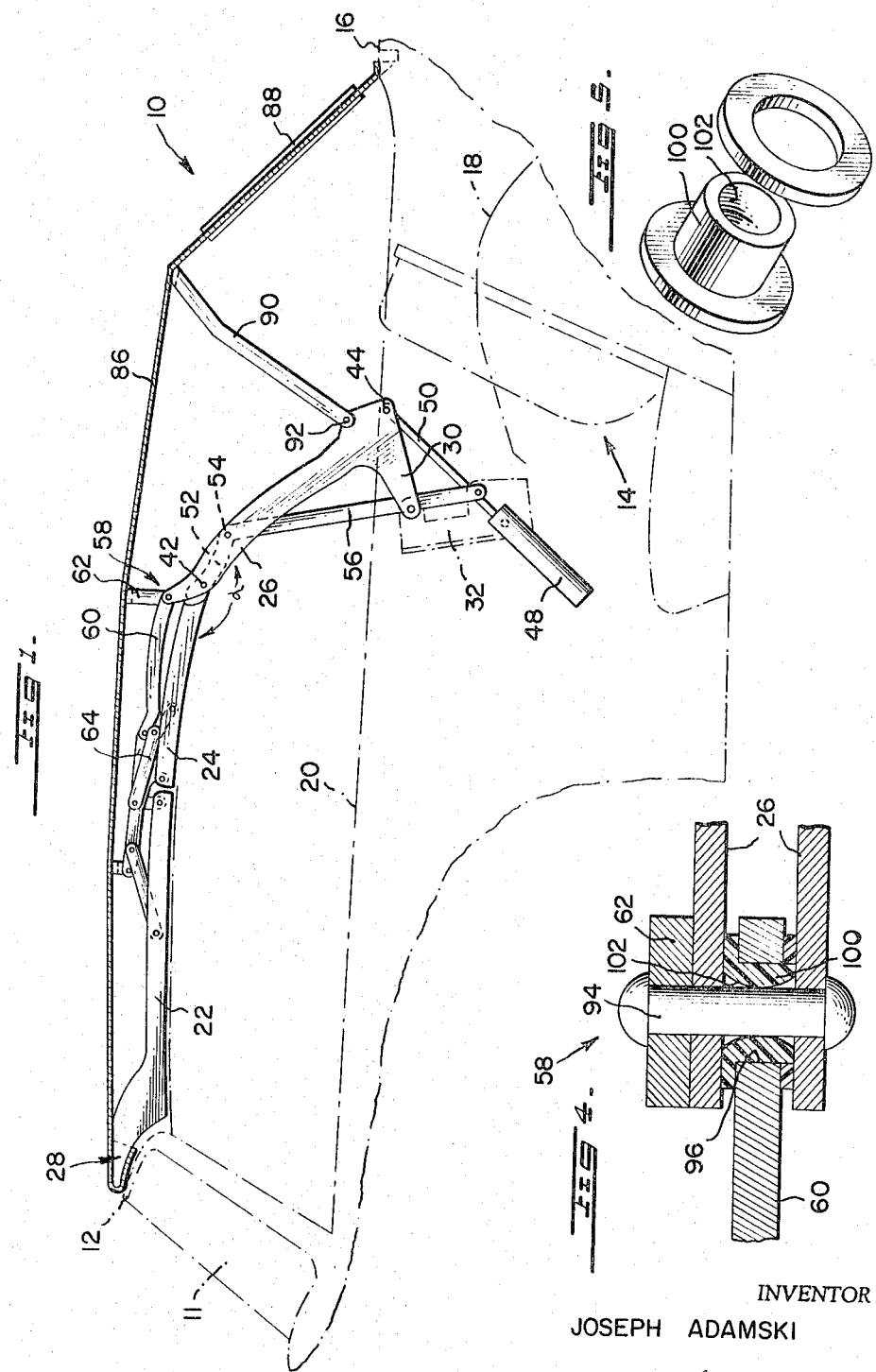

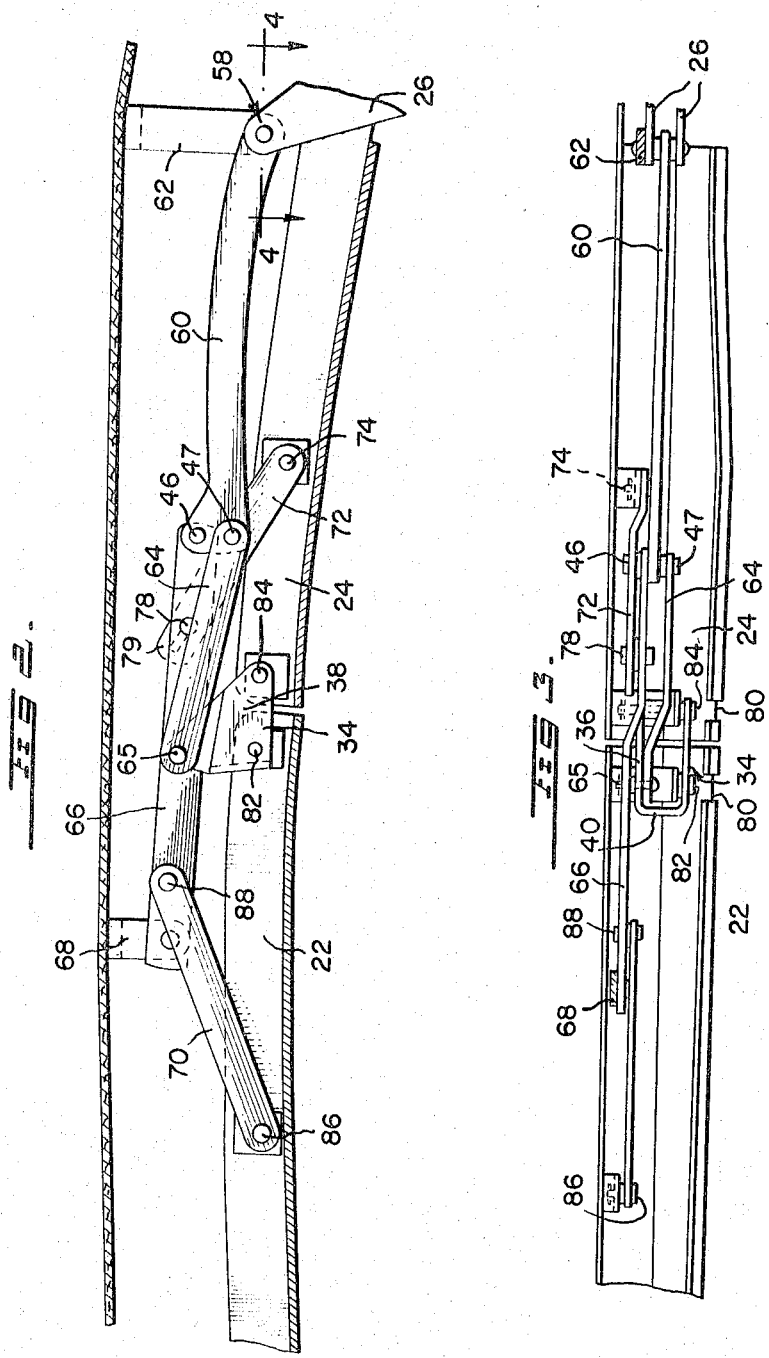

3,328,072
CONVERTIBLE TOP
Joseph Adamski, Brooklyn, Mich., assignor, by mesne assignments, to Dura Corporation, Oak Park, Mich., a corporation of New York
Filed Feb. 14, 1966, Ser. No. 527,235
3 Claims. (Cl. 296—116)

This invention relates to an improved folding top structure for motor vehicles.

It is a principal object of the present invention to provide a resilient connection in the articulate members of a folding top for motor vehicles to improve the operation of the structures and to insure an assembly which is free of undesirable looseness when the folding top structure is in the fully extended position and latched to the windshield header.

A further object of the present invention is to provide an improved folding top structure which during erection will insure proper alignment and cooperative mating engagement between the top header of the folding top structure and the windshield header.

It is a further object of the present invention to provide resilient bushing means in one of the articulate connections of an improved folding top for a motor vehicle which is shaped to provide an extension joint varying with the force applied to one of the interconnected members of said articulate connection.

Other objects and advantages are to provide means for obtaining an increased elongation or reach of the convertible top movable header durin gthe final movement of the extension portion of the cycle of operation of the folding top; means which will return to their normal interconnected relationship upon removal of the forces applied in extending the roof structure; and means which are relatively simple in construction, reliable in use, and which require substantially no maintenance or adjustment after final assembly.

These and other objects and advantages are provided in a folding top construction for a vehicle including a front rail, a center rail, a rear rail and a control link, means pivotally connecting the lower ends of the rear rail and control link to a convertible vehicle, means pivotally interconnecting one end of the center rail and one end of the front rail; means pivotally connecting the other ends of the center rail and the control link, a power link, means pivotally connecting one end of the power link to the other end of the rear rail, means pivotally interconnecting the center rail and the rear rail intermediate the ends of said rails, linkage means interconnecting the other end of the power link and the center and front rails, said linkage means normally determining the angular relationship between the center and the rear rails, and yieldable means forming a portion of the pivotal mounting means between the said other end of the rear rail and the power link.

The invention will be more particularly described in reference to the accompanying drawings wherein:

FIG. 1 is a transverse section view through a convertible top mechanism showing the top in the erected or extended position with certain parts shown in phantom;

FIG. 2 is an elevational view, partially in section and on an enlarged scale, of the central portion of the side rail and linkage assembly illustraed in FIG. 1;

FIG. 3 is a planned view of the portion of the structures illustrated in FIG. 2;

FIG. 4 is an enlarged partial sectional view taken on line 4—4 of FIG. 2; and

FIG. 5 is a disassembled view of the bushing illustrated in FIG. 4.

Referring now to the drawings, it will be seen that the top 10 is illustrated in connection with a typical vehicle body having a windshield 11, a windshield header 12, a rear seat 14, and a rear deck 16. The upper edge of the rear wheel housing is indicated by the line 18, and the top edge or belt line of the body by line 20.

When reference is made herein to "forward" or "rear" ends of links, rail sections, etc., it is meant the positions of these parts when the top is in its unfolded position as shown in FIG. 1.

The top itself comprises sectional side rails, cross bows and operating links. The side rails are identical for each side of the vehicle and consist of a front side rail section 22, a center side rail section 24 and a rear side rail section 26. The front rail section 22 is attached to the top header 28 which overlies the windshield header 12 and has means (not shown) for clamping it to the windshield header when the top is in its "up" or unfolded position.

The rear rail section 26 is provided with an integral angularly disposed portion 30 which is pivotally attached to a support bracket 32. The latter is rigidly attached by welding or other suitable means to the body side panel.

The front side rail section 22 is pivotally attached to the center rail section 24 by means of a bracket or pivot plate 34. As will be more clearly seen from FIGS. 2 and 3, the bracket is U-shaped and has an inside wall 36 of triangular shape, an outer wall 38, and a web 40 which connects the two walls to form a very strong structure.

The rear side rail section 26 overlies the center side rail section for a portion of its length and is pivotally connected thereto by a pin 42.

A hydraulic cylinder 48 having a reciprocable piston rod 50 is mounted for swinging movement to the bracket 32 and the rod 50 is pivoted at its outer end at pivot 44 to the portion 30 of the rear rail as shown.

Center rail section 24 has a rearwardly extending portion 52 which overlaps the forward end portion of rear side rail section 26 and is pivotally connected at 54 to a control link 56. The latter is pivoted at its lower end to bracket 32 below the pivotal connection of the rear rail section thereto.

The extreme front end portion of the rear or power rail section 26 is pivotally connected at 58 to a power link 60 and to one end of the center cross bow 62. A second power link 64 (or power link extension) extends forwardly from the forward end of the lower link 60 to a pivotal connection 65 with the plate 34. The power link 60 has a second pivot 46 (FIGS. 2 and 3) vertically adjacent the first pivot 47 which connects with a bow support link 66. The forward cross bow 68 is supported at the extreme forward end of link 66. A front rail control link 70 pivotally connects the front side rail section 22 with the link 66 through pivot pins 86 and 88.

A rocker arm 72 pivoted to the center rail section at 74 and to the links 60 and 64 at 47 has a pin and slot connection at 78–79, with the link 66.

It will be observed that the front and center side rail sections 22 and 24 are channel shaped in section, the inner web being continuous in section while the outside web has cutouts 80 to facilitate placing of pivot pins 82 and 84 for connecting the rails to the bracket 34.

The assembly also includes a roof fabric or cover 86, a rear glass window and frame 88, and a rear bow assembly 90, which is pivotally connected via the pin 92 to the more rearward portion of the rear rail structure 26.

Referring again to the drawings and in particular FIGS. 4 and 5, pivotal connection 58 between the upper end of the rear rail 26 and the rear portion of the power link 60 is the critical connection of the present invention.

From the drawings it will be noted that at its upper end the rear rail 26 is bifurcated and the connection 58 is made via a pivot pin 94 which passes through the bifurcated end of the rear rail such that the rearward end of the power link 60 is received therein. Further, as illustrated in FIG. 4 the bore 96 for pivot pin 94 in the rearward end of the power link 60 is oversize and a resilient bushing 100 is received in the bore 96.

The bushing 100 as more clearly illustrated in FIG. 5 is made in two sections so that the bushing can be assembled in the bore 96 at the rearward portion of the power link 60. The important feature of the bushing 100 is that the bore 102 is not cylindrical but curvilinear to provide only a restricted area of contact between the bushing and the cylindrical surface of the pin 94 as more clearly shown in FIG. 4 of the drawings.

Further, the material of construction of the bushing 100 is important as the bushing must have sufficient strength to generally maintain its shape during operation of the convertible and also the bushing must be resilient enough so that when force is applied to the power link 60 by the hydraulic ram and then to the rear rail 26 the curvilinear bearing surface of the bushing will be compressed and permit the power link 60 to move rearwardly from a position it would be in if there was a rigid non-yielding pivotal connection between the bifurcated end 26 of the rear rail and the power link 60. The desired combination of resistancy, substantial strength and the like, have been very adequately provided if the bushing member is made of nylon. While a nylon bushing having the curvilinear bore therethrough operates very satisfactorily in the illustrated assembly, other relatively high strength, moderately resilient materials may be employed such as Teflon and certain of the synthetic elastomeric materials.

The function of the bushing will be more clearly understood from the following description of the operation of the linkage members shown in FIGS. 1, 2 and 3. Referring to these drawings, when the top is in its erected position as shown in FIG. 1 the operator may lower the top by releasing the clamps which secure the top header 28 of the roof to the windshield header 12 and by actuating the hydraulic pump not shown for directing pressure fluid to the upper end of the ram cylinder 48. When the roof is fully retracted to erect the roof, the pressure fluid from the pump is directed to the lower end of the cylinder 48 whereupon piston rod 50 is moved upwardly causing the balance or control link 56 and the rear rail to pivot about their pivotal connections and to swing the rear rail section 26 counterclockwise about its pivot on the bracket 32. Initial movement of the rear rail section 26 will cause motion in the power link 60 to produce an upward thrust on the power link 60 which in turn, in acting through the linkages 64, 72, 66 and 70 (as described in my United States Patent 3,036,859, issued May 20, 1962) will cause the roof to unfold and to extend. As the convertible top header 28 approaches the windshield header 12 there is a substantial force applied by the upper end of the rear rail 26 tending to increase the angular relationship between the rear rail 26 and the center rail 24 about the pivot 42. As this angular relationship indicated on the drawing as angle alpha, increases then the effective length of the roof or the reach between the lower end of the rear rail and the bracket 32 and the most forward portion of the roof header 28 increases. It will be appreciated that if the angular relationship at alpha is a large angle the effective length of the interconnected rails 22, 24 and 26 would be increased. With the substantial force being applied at the pivotal connection 58 during extension of the roof, the resilient bushing 100 permits the power link 60 to move rearwardly and thereby compress the curvilinear bearing surface of the bushing. This slight rearward movement of the power link 60 increases the angle alpha thereby increasing the overall reach of the roof so that when the convertible roof header 28 contacts the windshield header 12 the clamping means for the roof header will be in positive mating relationship with the cooperating elements on the windshield header, notwithstanding the substantial rearward pull of the roof fabric, and, for example, the heavy hard glass window 88. As soon as the clamps are actuated securely holding the roof header 28 to the windshield header 12 and power to extend the roof is deenergized, the forces tending to compress the resilient bushing 100 are relieved and the resilient force of the compressed bushing then moves the power link 60 forwardly putting the final locking forces on the mechanism to insure a rattle-free type construction.

In one application of the construction illustrated in the drawings compression of the bushing 0.030 of an inch results in one inch increase in the overall reach of the roof thus insuring that the clamp means, to hold the roof to the front header, can be readily engaged.

The amount of movement can be controlled to a substantial extent by certain combinations of the diameter of the pin 94 and the radius of curvature of the curvilinear bore 102 in the bushing 100. For example, as the curvature of the curvilinear surface 102 is increased the greater is the amount of compression of the bushing with the same force applied thereto. As the radius decreases a greater amount of force is required to compress the bushing the same amount as the amount of compression is determined by the area of the resilient material which is acted on by the cylindrical surface of the bushing pin 94. Thus, control is also possible by selecting the diameter of the bore and also the diameter of the pin. As the diameter of the bore and the diameter of the pin increase a greater force is required to compress the bushing. Thus, a top designer can by selecting a particular pin and bushing combination provide the desired overreach at the point of making contact between the roof top header and the windshield top header.

From the foregoing discussion considered in conjunction with the illustrated embodiments of the invention, it will be seen that the present invention fully accomplishes the aims and objects hereinbefore set forth. It will also be apparent to those skilled in the art that the particular arrangement for applying power to the rear rail is not critical to the invention and power might be directed to the control link 56 or to both the control link and the rear rail 26 through a suitable linkage system.

I claim:

1. A folding top for vehicles including a front rail, a center rail, a rear rail and a control link, means pivotally connecting the lower ends of the rear rail and control link to a convertible vehicle, means pivotally interconnecting one end of the center rail and one end of the front rail; means pivotally connecting the other ends of the center rail and the control link, a power link, means pivotally connecting one end of the power link to the other end of the rear rail, means pivotally interconnecting the center rail and the rear rail intermediate the ends of said rails, linkage means interconnecting the other end of the power link and the center and front rails, said linkage means normally determining the angular relationship between the center and the rear rails, and resilient bushing means having a pin receiving bore therethorugh forming a portion of the pivotal mounting means between the said other end of the rear rail and the power link, the bore in said bushing being shaped to provide a relatively narrow line of contact between the bore and a pin receivable therein.

2. The invention defined in claim 1 wherein the bore in the bushing is curvilinear in transverse cross section to normally provide a relatively narrow line of contact between the bore and a pin receivable therein.

3. The invention defined in claim 2 wherein the bushing comprises nylon.

References Cited

UNITED STATES PATENTS

| 2,964,341 | 12/1960 | Doyle et al. | 287—101 |
| 3,036,859 | 5/1962 | Adamski | 296—116 |

FOREIGN PATENTS

| 644,054 | 8/1962 | Italy. |

BENJAMIN HERSH, *Primary Examiner.*
CHARLES C. PARSONS, *Assistant Examiner.*